(12) United States Patent
Manning

(10) Patent No.: US 10,230,526 B2
(45) Date of Patent: Mar. 12, 2019

(54) OUT-OF-BAND VALIDATION OF DOMAIN NAME SYSTEM RECORDS

(71) Applicant: William Manning, Playa Del Ray, CA (US)

(72) Inventor: William Manning, Playa Del Ray, CA (US)

( * ) Notice: Subject to any disclaimer, the term of this patent is extended or adjusted under 35 U.S.C. 154(b) by 57 days.

(21) Appl. No.: 14/983,093

(22) Filed: Dec. 29, 2015

(65) Prior Publication Data

US 2016/0191243 A1 Jun. 30, 2016

Related U.S. Application Data

(60) Provisional application No. 62/099,084, filed on Dec. 31, 2014.

(51) Int. Cl.
*H04L 9/32* (2006.01)
*H04L 29/12* (2006.01)
*H04L 29/06* (2006.01)

(52) U.S. Cl.
CPC ........... *H04L 9/32* (2013.01); *H04L 9/321* (2013.01); *H04L 9/3213* (2013.01); *H04L 61/1511* (2013.01); *H04L 63/00* (2013.01)

(58) Field of Classification Search
CPC ..................................................... H04L 61/63
USPC ......................................................... 713/168
See application file for complete search history.

(56) References Cited

U.S. PATENT DOCUMENTS

| 7,299,491 B2 * | 11/2007 | Shelest | H04L 63/08 726/26 |
|---|---|---|---|
| 8,910,245 B2 * | 12/2014 | Kondamuru | H04L 29/12066 709/221 |
| 9,167,428 B2 * | 10/2015 | Buntinx | H04L 63/062 |
| 9,288,193 B1 * | 3/2016 | Gryb | H04L 63/08 |
| 2002/0116485 A1 * | 8/2002 | Black | H04L 29/06 709/223 |
| 2014/0211942 A1 * | 7/2014 | Coric | H04L 9/08 380/277 |
| 2015/0127940 A1 * | 5/2015 | Polehn | H04L 63/0435 713/168 |
| 2015/0170072 A1 * | 6/2015 | Grant | G06Q 10/067 705/7.36 |
| 2015/0207814 A1 * | 7/2015 | Prince | H04L 63/1416 726/23 |
| 2015/0215267 A1 * | 7/2015 | Kagan | H04L 61/1511 709/245 |
| 2015/0271183 A1 * | 9/2015 | MacGregor | H04L 63/102 726/4 |
| 2015/0278820 A1 * | 10/2015 | Meadows | G06Q 20/40145 705/64 |
| 2015/0281217 A1 * | 10/2015 | Petrov | H04L 63/0876 726/10 |

(Continued)

OTHER PUBLICATIONS

RFC-2845.txt.pdf; RFC-4033.pdf.*

*Primary Examiner* — Taghi T Arani
*Assistant Examiner* — Badridot Champakesanatusptodotgov
(74) *Attorney, Agent, or Firm* — Blank Rome LLP

(57) ABSTRACT

An out-of-band Domain Name System (DNS) security technique uses a cryptographic blockchain for securing and validating DNS data in a chain of custody that exists outside the DNS namespace, allowing validated access to cached DNS information without requiring real-time access to root servers.

17 Claims, 10 Drawing Sheets

(56) References Cited

U.S. PATENT DOCUMENTS

| | | | |
|---|---|---|---|
| 2015/0350154 A1* | 12/2015 | Myla | H04L 61/1511 |
| | | | 709/245 |
| 2016/0028847 A1* | 1/2016 | Bradshaw | H04L 67/2842 |
| | | | 709/213 |
| 2016/0086418 A1* | 3/2016 | Smolen | G07F 9/006 |
| | | | 700/237 |
| 2016/0098730 A1* | 4/2016 | Feeney | G06Q 30/0185 |
| | | | 705/71 |
| 2016/0119282 A1* | 4/2016 | Bladel | H04L 61/302 |
| | | | 709/203 |
| 2016/0134593 A1* | 5/2016 | Gvili | H04L 63/0428 |
| | | | 713/170 |
| 2016/0203572 A1* | 7/2016 | McConaghy | G06F 21/10 |
| | | | 705/58 |
| 2016/0301590 A1* | 10/2016 | He | H04L 12/6418 |
| 2017/0061396 A1* | 3/2017 | Melika | G06Q 20/065 |
| 2017/0109676 A1* | 4/2017 | Marcu | G06F 11/3672 |
| 2017/0286951 A1* | 10/2017 | Ignatchenko | G06Q 20/3674 |

* cited by examiner

OUT-OF-BAND VALIDATION OF DOMAIN NAME SYSTEM RECORDS

TECHNICAL FIELD

The present invention relates to the field of information security, and in particular to techniques for out-of-band techniques for securing domain name information.

BACKGROUND ART

The Domain Name System (DNS) is a hierarchical distributed naming system for computers, services, or any resource connected to the Internet or a private network. The DNS associates information with domain names assigned to each of the participating entities. Most prominently, it translates domain names, which can be easily memorized by humans, to the numerical IP addresses needed for the purpose of computer services and devices worldwide. The DNS is an essential component of the functionality of most Internet services because it is the Internet's primary directory service.

The DNS distributes the responsibility of assigning domain names and mapping those names to Internet Protocol (IP) addresses by designating authoritative name servers for each domain. Authoritative name servers are assigned to be responsible for their supported domains, and may delegate authority over sub-domains to other name servers. This mechanism provides distributed and fault tolerant service and was designed to avoid the need for a single central database.

The DNS also specifies the technical functionality of the database service which is at its core. It defines the DNS protocol, a detailed specification of the data structures and data communication exchanges used in DNS, as part of the Internet Protocol Suite. The DNS has been in wide use since the 1980s.

The DNS maintains the domain name hierarchy and provides translation services between the domain name hierarchy and the IP address spaces. Internet name servers and a communication protocol implement the DNS. A DNS name server is a server that stores the DNS resource records for a domain name; a DNS name server responds with answers to queries against its database.

The most common types of resource records stored in the DNS database are for DNS zone authority (SOA), IP addresses (A and AAAA), Simple Mail Transport Protocol (SMTP) mail exchangers (MX), name servers (NS), pointers for reverse DNS lookups (PTR), and domain name aliases (CNAME). Although not intended to be a general purpose database, DNS can store resource records for other types of data for either automatic machine lookups or for human queries such as responsible person (RP) records.

Originally, security concerns were not major design considerations for DNS software or any software for deployment on the early Internet, as the network was not open for participation by the general public. However, the expansion of the Internet into the commercial sector in the 1990s changed the requirements for security measures to protect data integrity and user authentication.

Several vulnerability issues were discovered and exploited by malicious users. One such issue is DNS cache poisoning, in which data is distributed to caching resolvers under the pretense of being an authoritative origin server, thereby polluting the data store with potentially false information and long expiration times (time-to-live). Subsequently, legitimate application requests may be redirected to network hosts operated with malicious intent.

DNS responses are traditionally not cryptographically signed, leading to many attack possibilities. The Domain Name System Security Extensions (DNSSEC) modify the DNS to add support for cryptographically signed responses. Other extensions have been proposed as an alternative to DNSSEC. Other extensions add support for cryptographic authentication between trusted peers and are commonly used to authorize zone transfer or dynamic update operations. DNSSEC incorporates digital signatures into the DNS hierarchy, with each level owning its own signature generating keys. Thus, each organization in the DNS hierarchy must sign the key of the one below it. During validation, DNSSEC follows this "chain of trust" up to the root, automatically validating "child" keys with "parent" keys along the way.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
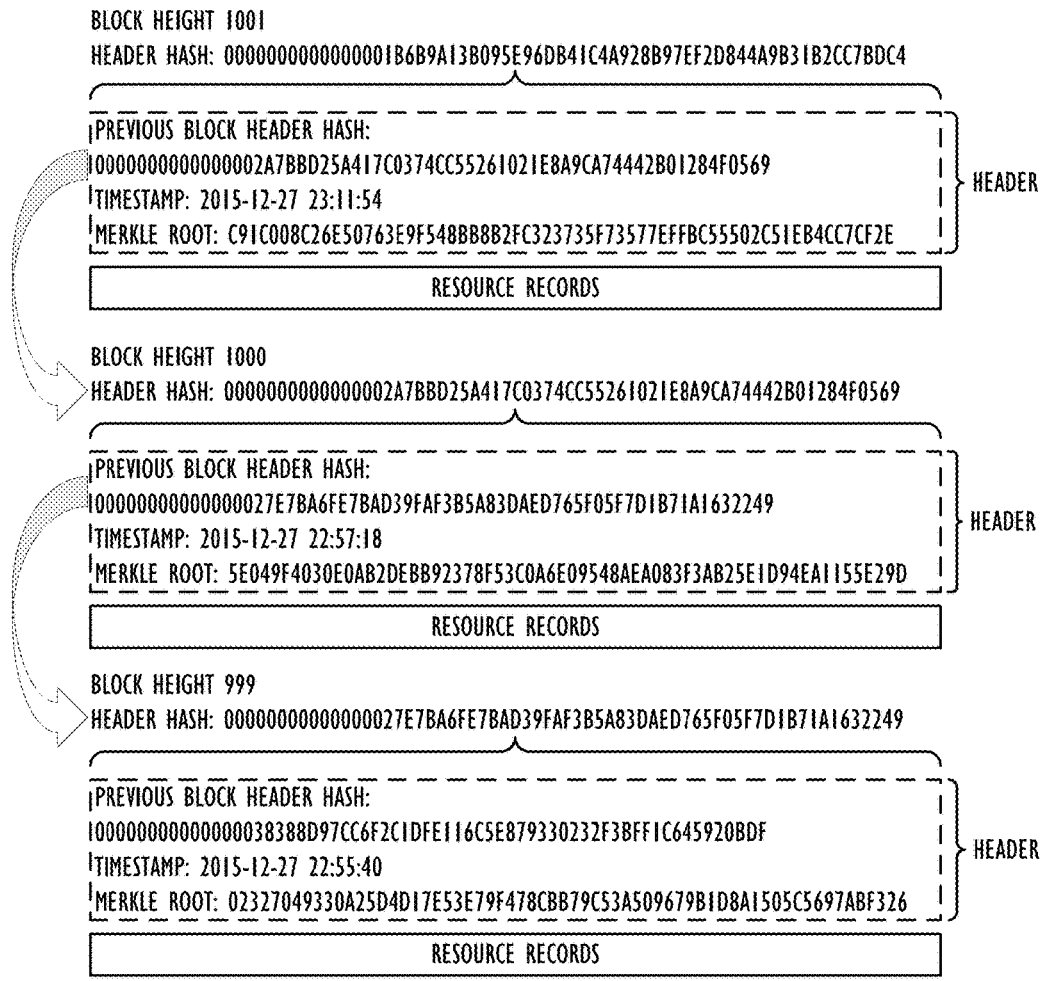
FIG. 1 is an illustration of a blockchain for secure storage of domain name system resource records according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments can implement the features and functionality described herein in software, firmware, or hardware as desired, including any combination of software, firmware, and hardware. References to daemons, drivers, engines, modules, or routines should not be considered as suggesting a limitation of the embodiment to any type of implementation.

As used herein, the term "a computer system" can refer to a single computer or a plurality of computers working together to perform the function described as being performed on or by a computer system.

As used herein, the term "a machine readable medium" can refer to a single physical medium or a plurality of physical media that together hold the information that is described as being stored on the machine readable medium.

As used herein, the term "in-band" means that requests are satisfied via conventional DNS functionality. The term "out-of-band" means that information outside of the DNS system, such as the private blockchains described below, is used for satisfying the request.

DNSSEC is an in-band security functionality, in that the security information is stored in additional records of the DNS. When a resolver receives a DNS lookup answer, the resolver may then check that the answer is correct. The "chain of trust" used by DNSSEC involves traversing the entire DNS hierarchy from one of the DNS root nodes to the end node, using DS and DNS Key (DNSKEY) records for the DNS root, then DS records to verify the DNSKEY records for every node on a path through the DNS to the end node. Finally, the resolver verifies the Resource Record Signature (RRSIG) record found in the answer for the A records corresponding to the fully qualified domain name. By following the "chain of trust" all the way up to the root, the resolver can be ensured of the integrity of the DNS, i.e., that it has not been compromised or has dangling chains that do not reach the root of the hierarchy. A problem with this procedure is that it requires access to every DNS server in the hierarchy of DNS servers all the way to the root for every DNS access that is to have security verified, where with a normal (unsecured) lookup, the resolver merely needs to validate that it can reach its parent in the hierarchy. This makes the DNS and securing the DNS more brittle than would be desirable, because an "always-on" connectivity is required all the way back to the root structure of the DNS, or alternately, some parent DNS node has cached the DNS SEC credentials back to the root, which avoids the need to have real-time access to the root, but runs the risk that someone has manipulated the cached credentials somewhere in the middle. Neither alternative is a very robust mechanism.

By moving the validation hierarchy out of the DNS into a block chain, these problems may be avoided, and the performance of the DNS server may be improved, particularly in situations where the connectivity may be less than optimum.

Although blockchains are commonly thought of in terms of the blockchain used by the Bitcoin cryptocurrency, blockchains are not limited to currency applications, and are described in more detail below. In addition, although in currency and some other types of transactional blockchain systems the blockchain is distributed across multiple holders, each holder having a complete copy of the blockchain, the blockchains described herein are private blockchains, with the blockchain being held only by a single entity. As described below, in some embodiments the private blockchains may be held by a third party entity acting on behalf of a domain name server that has contracted or otherwise authorized the third party entity to manage the private blockchain for the domain name server. This third party entity may manage private blockchains for multiple domain name servers, and in such embodiments, may maintain separate blockchains for each of the authorizing domain name servers for which the third party is acting.

In general, a blockchain data structure is an ordered, back-linked list of blocks of records, which may be transactions in a blockchain used in a currency application, but in the case of the domain name system comprise domain name system resource records. The private blockchain acts as a replacement for the conventional domain name system cache, although embodiments may employ both a domain name system cache in a conventional form and a private blockchain. Because of its private nature, some of the features common in blockchains used in currencies, for example blocks with multiple children and complex procedures for "mining" blocks may not be needed, providing a simpler blockchain implementation that, for example, the blockchain used by Bitcoin systems.

The blockchain can be stored as a flat file, or in a simple database. In one embodiment, the private blockchains and related metadata may be stored using Google's LevelDB database, but any desired storage technique allowing addressability by an operating system executing on the underlying hardware may be used. Blocks are linked "back," each referring to the previous block in the chain. The blockchain may be visualized as a vertical stack, with blocks layered on top of each other and the first block serving as the foundation of the stack. The visualization of blocks stacked on top of each other results in the use of terms such as "height" to refer to the distance from the first block, and "top" or "tip" to refer to the most recently added block.

Each block within the blockchain is identified by a hash, generated using a cryptographic hash algorithm, such as the Secure Hash Algorithm 256 (SHA256) cryptographic hash algorithm, on the header of the block. Each block also references a previous block, known as the parent block, through the "previous block hash" field in the block header. Thus, each block contains the hash of its parent inside its own header. The sequence of hashes linking each block to its parent creates a chain going back all the way to the first block ever created, known as the genesis block.

A block has just one parent. Although in some uses of blockchains blocks can temporarily have multiple children, embodiments of the private blockchains used here typically only have a single child. The child refers back to its parent and contains a parent hash in the "previous block hash" field.

The "previous block hash" field is inside the block header and thereby affects the current block's hash. The child's own identity changes if the parent's identity changes. When the parent is modified in any way, the parent's hash changes. The parent's changed hash necessitates a change in the "previous block hash" pointer of the child. This in turn causes the child's hash to change, which requires a change in the pointer of the grandchild, which in turn changes the grandchild, and so on. This cascade effect ensures that once a block has one or more generations following it, the parent block cannot be changed without forcing a recalculation of all subsequent blocks. Because such a recalculation would require enormous computation, the existence of a long chain of blocks makes the blockchain's deep history immutable, providing security for the blockchain. Any tampering with the blockchain should be easily detectable.

A blockchain may therefore be thought of as a form of a ledger, recording events or transactions. In the case of a cryptocurrency such as Bitcoin, these would be financial transactions. In the case of a domain name system private blockchain as described herein, the events are domain name system resource records that have been requested or accessed, so that the blockchain becomes a private ledger recording information about domain name system resources that have been encountered, analogous to and potentially replacing the more conventional domain name server cache, providing the performance benefits of a secure cache without the necessity to have always-on connectivity to the domain name system root.

Structure of a Block

A block is a container data structure that aggregates domain name system resource records for inclusion in the private ledger, the private blockchain. Each block is made of a header, containing metadata, followed by a list of resource records that typically make up the bulk of its size. In one embodiment, the block header is 80 bytes, whereas resource records may be longer or shorter and the average block contains a plurality of resource records, each analogous to a transaction in a currency blockchain such as Bitcoin. A complete block, with all transactions, may be therefore significantly times larger than the block header. Table 1 describes the structure of a block according to one embodiment. This structure is illustrative and by way of example only, and alternate structures may be used as desired.

TABLE 1

The structure of a block

| Size | Field | Description |
| --- | --- | --- |
| 4 bytes | Block Size | The size of the block, in bytes, following this field |
| 80 bytes | Block Header | Several fields form the block header |
| 1-9 bytes (VarInt) | Record Counter | How many records follow |
| Variable | Records | The resource records recorded in this block |

Block Header

In one embodiment, the block header consists of three sets of block metadata. First, there is a reference to a previous block hash, which connects this block to the previous block in the blockchain. The second set of metadata may contain items such as a timestamp for the creation of the block. Although Bitcoin blockchains contain other metadata related to the mining process, such metadata is not needed for the private blockchains described here. However, implementations may provide fields for items such as difficulty target and proof-of-work nonce counters for consistency with Bitcoin blockchains if desired. The third piece of metadata may be a Merkle tree root, a data structure used to efficiently summarize all the transactions in the block. Table 2 describes the structure of a block header according to one embodiment. The fields illustrated in Table 2 are illustrative and by way of example only, and other fields and arrangements of fields may be used as desired.

TABLE 2

The structure of the block header

| Size | Field | Description |
| --- | --- | --- |
| 4 bytes | Version | A version number to track software/protocol upgrades |
| 32 bytes | Previous Block Hash | A reference to the hash of the previous (parent) block in the chain |
| 32 bytes | Merkle Root | A hash of the root of the Merkle tree of this block's transactions |
| 4 bytes | Timestamp | The approximate creation time of this block (typically seconds from Unix Epoch) |

Block Identifiers: Block Header Hash and Block Height

The primary identifier of a block is its cryptographic hash, a digital fingerprint, in one embodiment made by hashing the block header twice through a hash algorithm such as the Secure Hash Algorithm 256 (SHA256) algorithm. The resulting 32-byte hash is called the block hash but is more accurately the block header hash, because only the block header is used to compute it. Unlike distributed blockchains such as Bitcoin, which use a common first block everywhere, each private blockchain may use its own unique first block, as described in more detail below. The block hash identifies a block uniquely and unambiguously and can be independently derived by any node by simply hashing the block header.

The block hash does not need to be included inside the block's data structure when it is stored on a node's persistence storage as part of the blockchain. Instead, the block's hash may be computed as resource records are stored in the block. In some embodiments, the block hash may be stored in a separate database table as part of the block's metadata, to facilitate indexing and faster retrieval of blocks from disk.

A second way to identify a block is by its position in the blockchain, called the block height. The first block ever created is at block height 0 (zero). A block can thus be identified two ways: by referencing the block hash or by referencing the block height. Each subsequent block added "on top" of that first block is one position "higher" in the blockchain, like boxes stacked one on top of the other.

In a blockchain system like Bitcoin, unlike the block hash, the block height is not a unique identifier. Although a single block will always have a specific and invariant block height, the reverse is not true—the block height does not always identify a single block. Two or more blocks might have the same block height, competing for the same position in the blockchain. In the private blockchains described herein, however, instead of multiple miners independently creating blocks to be added to a blockchain, embodiments of the blockchain create the blocks by the entity holding the blockchain, thus the block height is also a unique identifier in such embodiments. The block height is also not a part of the block's data structure; it is not stored within the block. Each private blockchain holder may dynamically identify a block's position (height) in the blockchain when the block is added to the private blockchain. The block height might also be stored as metadata in an indexed database table for faster retrieval.

The Genesis Block

The first block in the blockchain is called the genesis block. The genesis block is the common ancestor of all the blocks in the blockchain, meaning that if you start at any block and follow the chain backward in time, you will eventually arrive at the genesis block. Unlike distributed blockchains such as Bitcoin, each private blockchain may employ its own genesis block, which may reference a different set of resource records. In various embodiments, the genesis block node may be selected using external information.

Unlike blockchains like Bitcoin, where every node always starts with a blockchain of at least one block because the genesis block is statically encoded within the bitcoin client software, such that it cannot be altered, embodiments described here may create private blockchains with each private blockchain having a different genesis block. The genesis block includes resource records from the domain name system node selected as the genesis block for the domain name server with which the private blockchain is associated.

Linking Blocks in the Blockchain

Because the blockchains described herein are private blockchains, each holder of a blockchain holds a complete blockchain, starting at the genesis block; no one else has a copy. The private blockchain is constantly updated as new blocks are created and used to extend the chain as additional resource records are cached from the domain name system. As a node receives requests for domain name system resource records that it has not previously cached, the node creates new blocks, inserts the resource records, and then links them to the existing private blockchain. To establish a link, a node will examine the incoming block header and look for the "previous block hash."

Let's assume, for example, that a node has 1,000 blocks in the private blockchain. The last block the node knows about is block 1,000, with a block header hash of 00000000000000027e7ba6fe7bad39faf3b5a83daed765f05f7d1b71a1632249.

The node then creates a new block for storing n resource records, as follows, with all values illustrative only and with the fields expressed in readable form for this discussion:

```
{
  "size" : 43560,
  "version" : 2,
  "previousblockhash" :
      "00000000000000027e7ba6fe7bad39faf3b5a83daed765f05f7d1b71a1632249",
  "Merkleroot" :
      "5e049f4030e0ab2debb92378f53c0a6e09548aea083f3ab25e1d94ea1155e29d",
  "time" : 1388185038,
  "rr" : [
     [Resource record 1],
#[... other resource records omitted ...]
     [Resource record n]
  ]
}
```

The previousblockhash field contains the hash of its parent block the last block on the chain at height 1,000. Therefore, this new block is a child of the last block on the chain and extends the existing blockchain. The node adds this new block to the end of the chain, making the blockchain longer with a new height of 1,001. FIG. 1 is a block diagram that illustrates a chain of three blocks, linked by references in the previousblockhash field.

Merkle Trees

In one embodiment, each block in the private blockchain contains a summary of all the resource records in the block, using a Merkle tree.

A Merkle tree, also known as a binary hash tree, is a data structure used for efficiently summarizing and verifying the integrity of large sets of data. Merkle trees are binary trees containing cryptographic hashes. The term "tree" describes a branching data structure, but these trees are usually displayed upside down with the "root" at the top and the "leaves" at the bottom of a diagram, as is illustrated in the examples that follow.

Merkle trees are used in one embodiment to summarize all the resource records in a block, producing an overall digital fingerprint of the entire set of transactions, providing a very efficient process to verify whether a resource record is included in a block. A Merkle tree is constructed by recursively hashing pairs of nodes until there is only one hash, called the root, or Merkle root. The cryptographic hash algorithm used in one embodiment for creating Merkle trees is SHA256 applied twice, also known as double-SHA256.

When N data elements are hashed and summarized in a Merkle tree, you can check to see if any one data element is included in the tree with at most $2*\log_2(N)$ calculations, making this a very efficient data structure.

Figure 2:
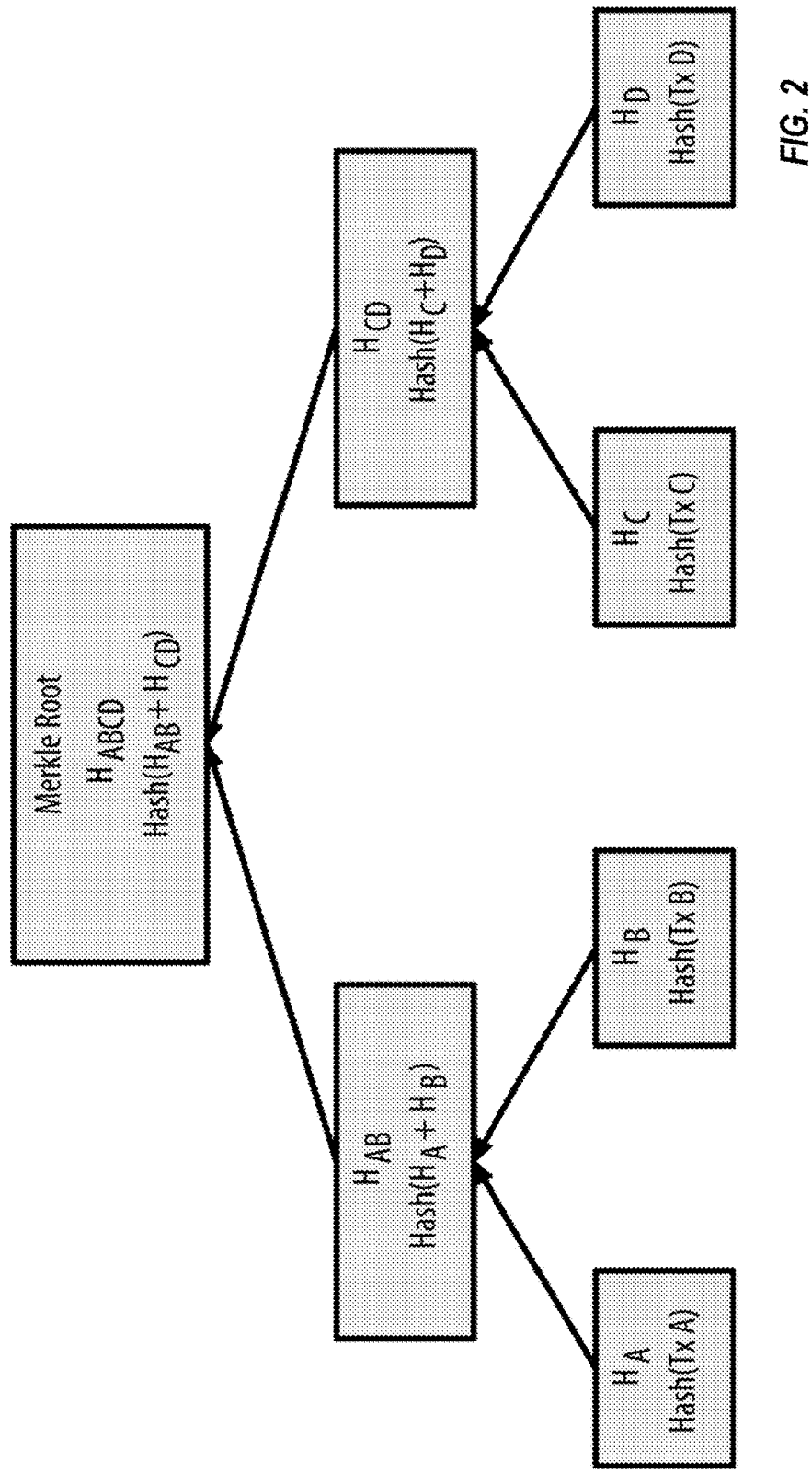
FIGS. 2-5 are graphs illustrating Merkle trees that may be used in blockchains according to one embodiment.

The Merkle tree is constructed bottom-up. In the following example, we start with four transactions, A, B, C and D, which form the leaves of the Merkle tree, as shown in FIG. 2. The transactions are not stored in the Merkle tree; rather, their data is hashed and the resulting hash is stored in each leaf node as $H_A$, $H_B$, $H_C$, and $H_D$:

$$H_A = \text{SHA256}(\text{SHA256}(\text{Resource Record } A))$$

Consecutive pairs of leaf nodes are then summarized in a parent node, by concatenating the two hashes and hashing them together. For example, to construct the parent node $H_{AB}$, the two 32-byte hashes of the children are concatenated to create a 64-byte string. That string is then double-hashed to produce the parent node's hash:

$$H_{AB} = \text{SHA256}(\text{SHA256}(H_A + H_B))$$

The process continues until there is only one node at the top, the node known as the Merkle root. That 32-byte hash is stored in the block header and summarizes all the data in all four resource records.

Figure 3:
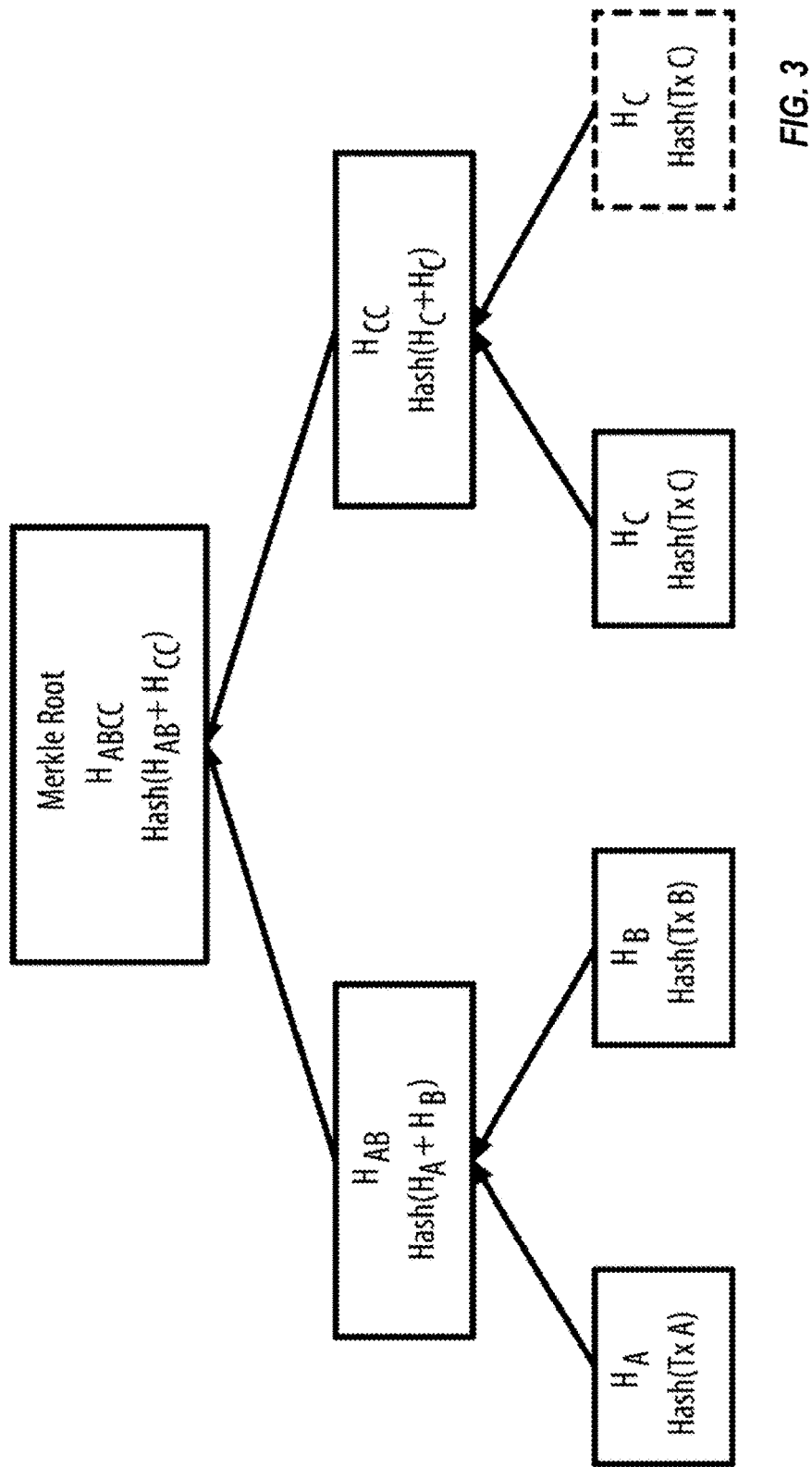

Because the Merkle tree is a binary tree, it needs an even number of leaf nodes. If there is an odd number of transactions to summarize, the last transaction hash will be duplicated to create an even number of leaf nodes, also known as a balanced tree. This is illustrated in FIG. 3, where transaction C is duplicated.

Figure 4:
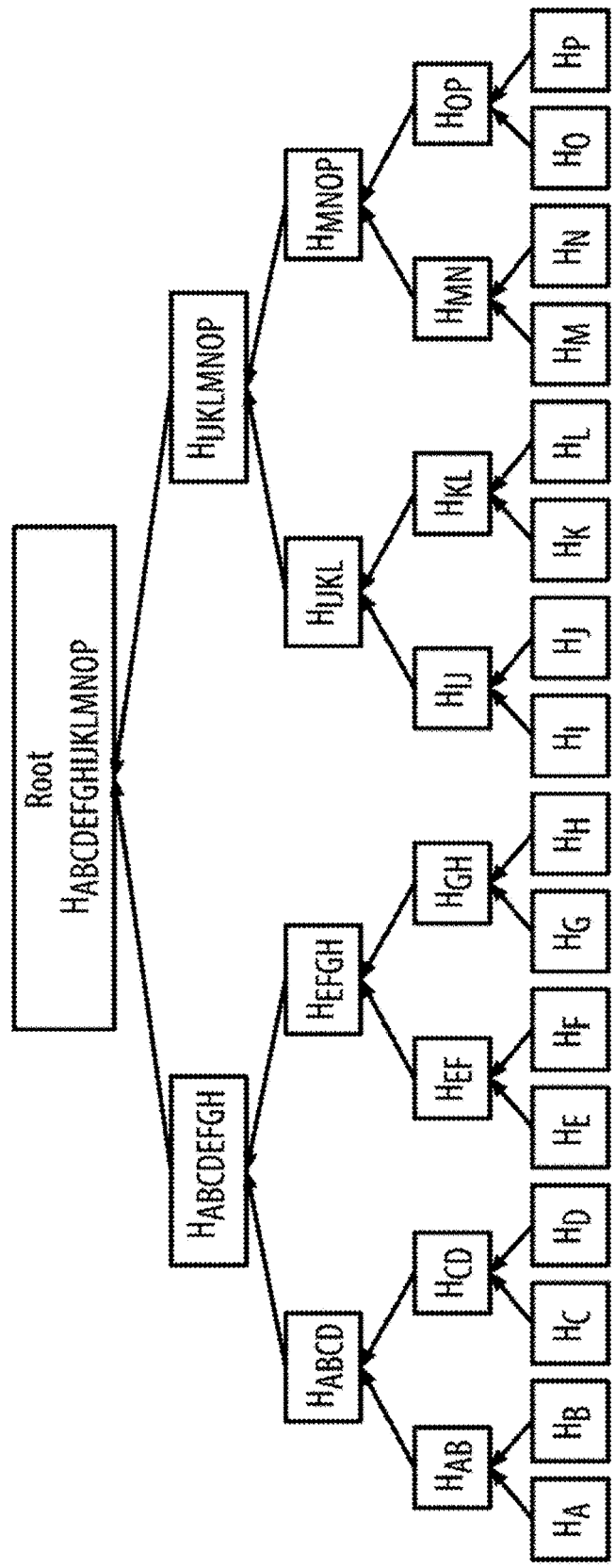

The same method for constructing a tree from four transactions can be generalized to construct trees of any size. In various embodiments, there may be any number of resource records in a single block, which are summarized in exactly the same way, producing just 32 bytes of data as the single Merkle root. In FIG. 4, a tree has built from 16 resource records. Note that although the root looks bigger than the leaf nodes in the diagram, it is the exact same size, just 32 bytes. Whether there is one resource record or a hundred thousand resource records in the block, the Merkle root always summarizes them into 32 bytes.

To prove that a specific resource record is included in a block, a node only needs to produce $\log_2(N)$ 32-byte hashes, constituting an authentication path or Merkle path connecting the specific transaction to the root of the tree. This is especially important as the number of resource records increases, because the base-2 logarithm of the number of resource records increases much more slowly. This allows embodiments to efficiently produce paths of 10 or 12 hashes (320-384 bytes), which can provide proof of a single resource record out of more than a thousand recource records in a megabyte-size block.

Figure 5:
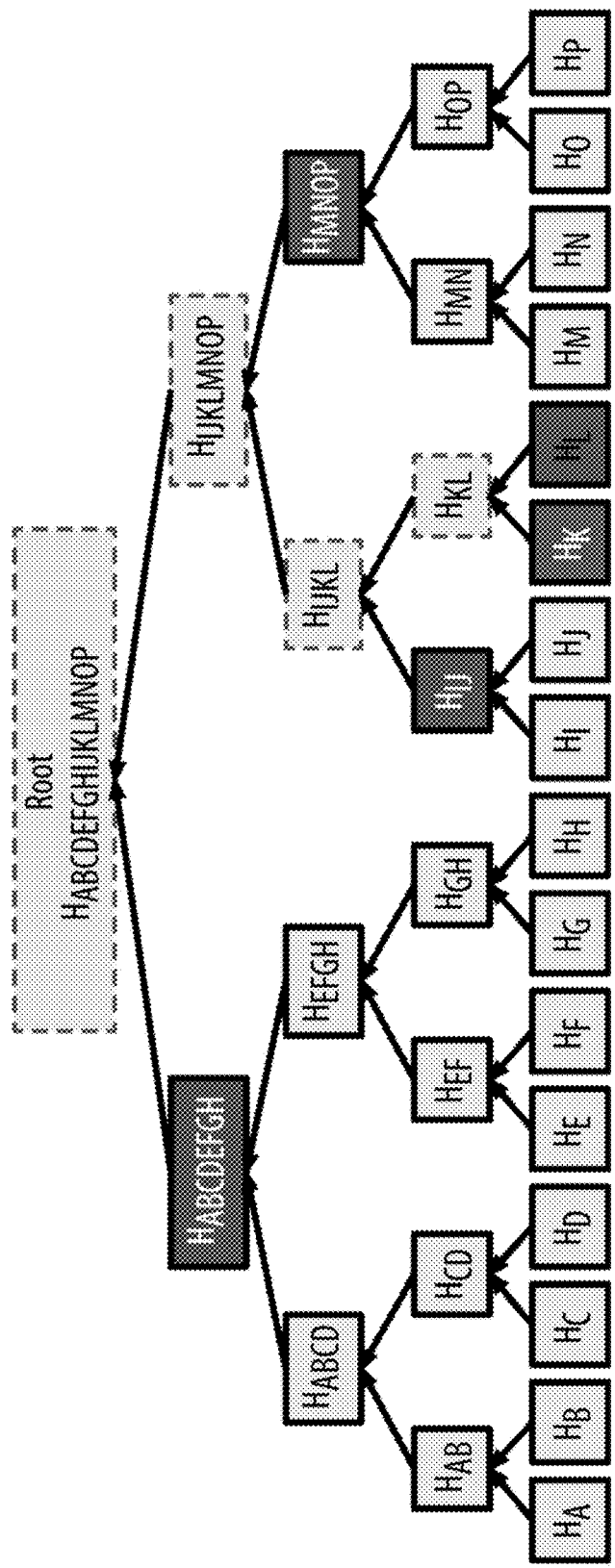

In FIG. 5, a node can prove that a resource record K is included in the block by producing a Merkle path that is only four 32-byte hashes long (128 bytes total). The path consists of the four hashes $H_L$, $H_{IJ}$, $H_{MNOP}$ and $H_{ABCDEFGH}$. With those four hashes provided as an authentication path, any node can prove that HK is included in the Merkle root by computing four additional pair-wise hashes $H_{KL}$, $H_{IJKL}$, $H_{IJKLMNOP}$, and the Merkle tree root (outlined in a dotted line in the diagram).

The efficiency of Merkle trees becomes obvious as the scale increases. Table 3 shows the amount of data that needs to be exchanged as a Merkle path to prove that a transaction is part of a block.

TABLE 3

Merkle tree efficiency

| Number of records | Approx. size of block | Path size (hashes) | Path size (bytes) |
|---|---|---|---|
| 16 records | 4 kilobytes | 4 hashes | 128 bytes |
| 512 records | 128 kilobytes | 9 hashes | 288 bytes |
| 2048 records | 512 kilobytes | 11 hashes | 352 bytes |
| 65,535 records | 16 megabytes | 16 hashes | 512 bytes |

As can be seen from the table, while the block size increases rapidly, from 4 kilobytes (KB) with 16 records to a block size of 16 megabytes (MB) to fit 65,535 records, the Merkle path required to prove the inclusion of a transaction increases much more slowly, from 128 bytes to only 512 bytes. With Merkle trees, a node can read just the block headers (80 bytes per block) and still be able to identify a resource record's inclusion in a block by retrieving a small Merkle path from a full node, without storing or transmitting the vast majority of the blockchain, which might be several gigabytes in size.

Using the Blockchain

In one embodiment, a DNS server maintains its own blockchain, analogous to maintaining its own DNS cache. In another embodiment, a DNS server may authorize, such as by contract, a third party to maintain the blockchain for the DNS server. The third party may, and typically does, maintain blockchains for multiple DNS servers, offering blockchain maintenance as a service. In such an embodiment, the DNS server sends a request to the third party blockchain maintainer to retrieve resource records from the blockchain, typically in response to a DNS request made to the DNS server.

In the following discussion, DNS KEY resource record sets (RRsets) are used as examples of the RRsets that are stored in the private blockchain. The KEY RRsets are signed RRsets, where the domain name used to sign the KEY RRset is the domain name itself. In one embodiment, the signature is stored in an X.509 Extended Validation (EV) certificate that is encoded as a CERT resource record as part of the overall RR set for the domain entry. An X.509 EV certificate is an X.509 public key certificate issued according to a specific set of identity verification criteria. These criteria require extensive verification of the requesting entity's identify by the certificate authority (CA) before a certificate is issued.

Thus, continuing this example, when a DNS server maintaining a private blockchain gets a request for a KEY RRset, the blockchain is searched and the KEY RRset is provided from the blockchain. If the KEY RRset is not found in the blockchain, the DNS server may obtain the KEY RRset from the DNS and store the KEY RRset on the blockchain. Thus, the blockchain becomes in effect a DNS cache, but one that that stored outside of the DNS in a blockchain.

In an embodiment in which the private blockchain for a DNS server is maintained by a third party, the when receiving a request for an RRset, the DNS server sends a request to the third party maintaining the blockchain, who retrieves the RRset from the blockchain and returns it to the DNS server for responding to the request. Similarly, if the third party determines the blockchain does not contain the requested RRset, the third party can obtain the RRset from the DNS and store it in the blockchain for the next time the RRset is requested. The third party may in this embodiment be the signer of the RRset records stored in the block. Because the blockchain is secure, the DNS server can trust the RRset data returned from the blockchain, and does not need to traverse the DNS hierarchy to obtain the requested RRset data.

The third party may validate the request from the DNS server in any desired manner. For example, if the third party maintains private blockchains for multiple DNS servers, the request from the DNS server to the third party may use a previously provided unique token identifying the DNS server to determine which blockchain maintained by the third party to associate with the DNS server.

The genesis block of the blockchain in some embodiments may be selected as desired, using out-of-band information. Information provided by the genesis DNS node may be validated using conventional in-band techniques, such as DNSSEC validation, which may require traversing the chain of trust from the genesis node to the DNS root. However, once the genesis node's RRsets are signed and stored in the blockchain, the out-of-band validation of the data provided by the blockchain allows securely obtaining the RRsets without requiring active connectivity to the root of the DNS. The genesis block on the blockchain then becomes the parent block for the next level of the blockchain, which may be created the next time an RRset is requested.

In one embodiment, RRsets may be checked to determine whether any of the records have expired, thus are no longer valid. In such a situation, the block of the blockchain containing the expired RRset may be marked as invalid or corrupted, and a new block added to the blockchain after obtaining an updated version of the RRset data. Any time that RRset data is added to a block, the RRset data may be signed, for example using an X.509 EV certificate, for additional security of the data.

Figure 6:
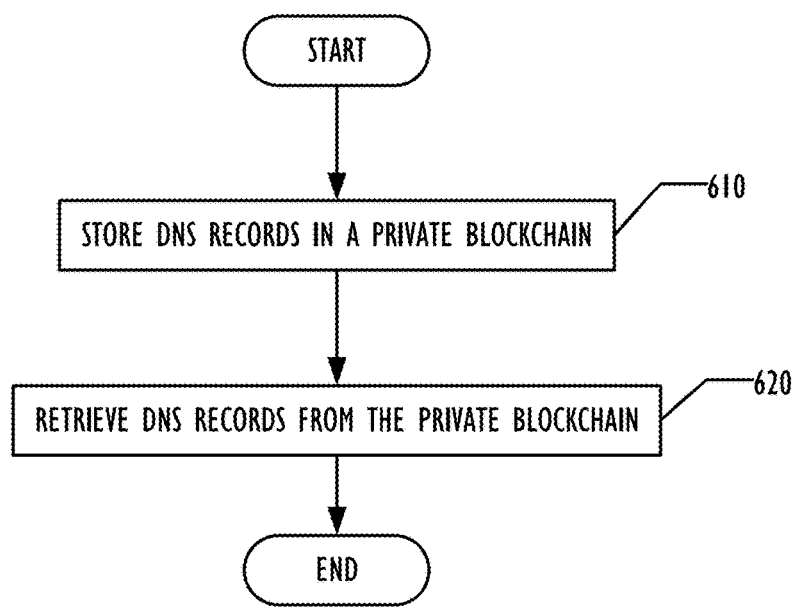
FIG. 6-9 are flowcharts illustrating various aspects of techniques for out-of-band validation, storage, and retrieval of domain name system resource records according to one embodiment.

FIG. 6 is a flowchart at a high level illustrating a system that uses a blockchain according to one embodiment. In block 610, the DNS server (or third party managing the blockchain for the DNS server) may store DNS RRsets in the blockchain, providing a secure ledger or cache for the stored RRset data. In block 620, the DNS server (or third party managing the blockchain for the DNS server) may retrieve secured RRset data from the blockchain. Both the store and retrieve actions are performed out-of-band, because the blockchain is not stored in the DNS address space, and allow obtaining verified RRset data without the need to traverse the chain of trust to the root, providing significant performance advantages, as well as robustness in the case of connectivity breaks.

Figure 7:
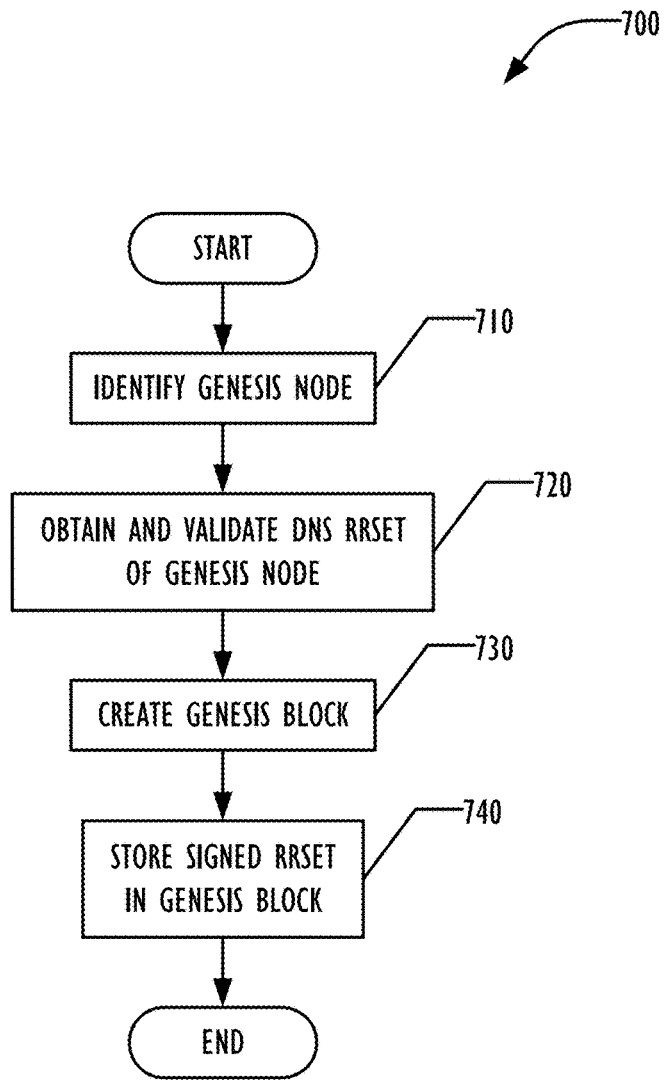

FIG. 7 is a flowchart illustrating the generation of a genesis block for the blockchain according to one embodiment. In block 710, a genesis node of the DNS may be determined, using any desired technique. In some embodiments, the genesis node will be selected because of the availability of external information. In block 720, RRset data associated with the genesis node is obtained and validated. In some embodiments, the validation will be performed using DNSSEC protocols. The blockchain holder then creates a first block on the blockchain in block 730 and in block 740 stores the RRset, signed by the blockchain holder, in the genesis block. As new blocks are added to the blockchain as DNS requests are made and served, additional blocks will be linked to this genesis block as described above.

Figure 8:
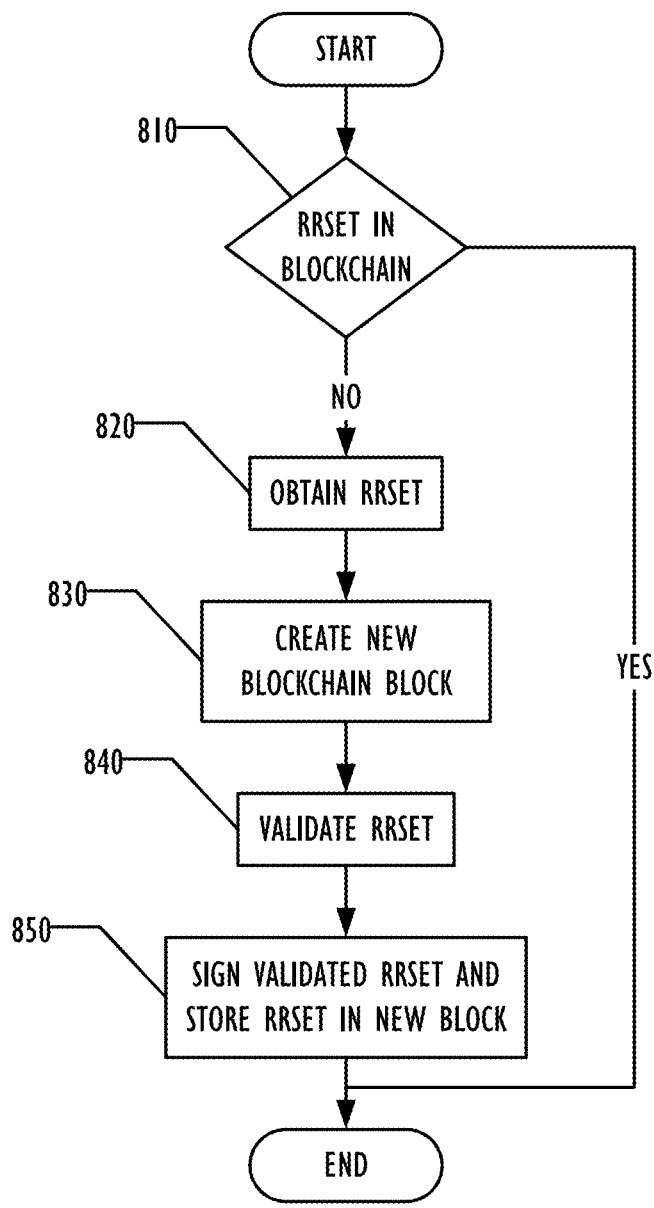

FIG. 8 is a flowchart illustrating the creation of a new block in the blockchain according to one embodiment. In block 810, the blockchain is checked for the presence of a block containing a desired RRset. If the block containing the RRset is available, then the RRset data may be retrieved and used. But if no block containing the RRset is available, then in block 820 the RRset may be obtained from the DNS. A new blockchain block is created in block 830. In block 840, the RRset is validated, using DNSSEC protocols or any other desired technique. The blockchain holder (either the DNS server or third party managing the blockchain for the DNS server) then in block 850 signs the RRset with the blockchain holder's private key and stores the signed RRset in the new blockchain block.

Figure 9:
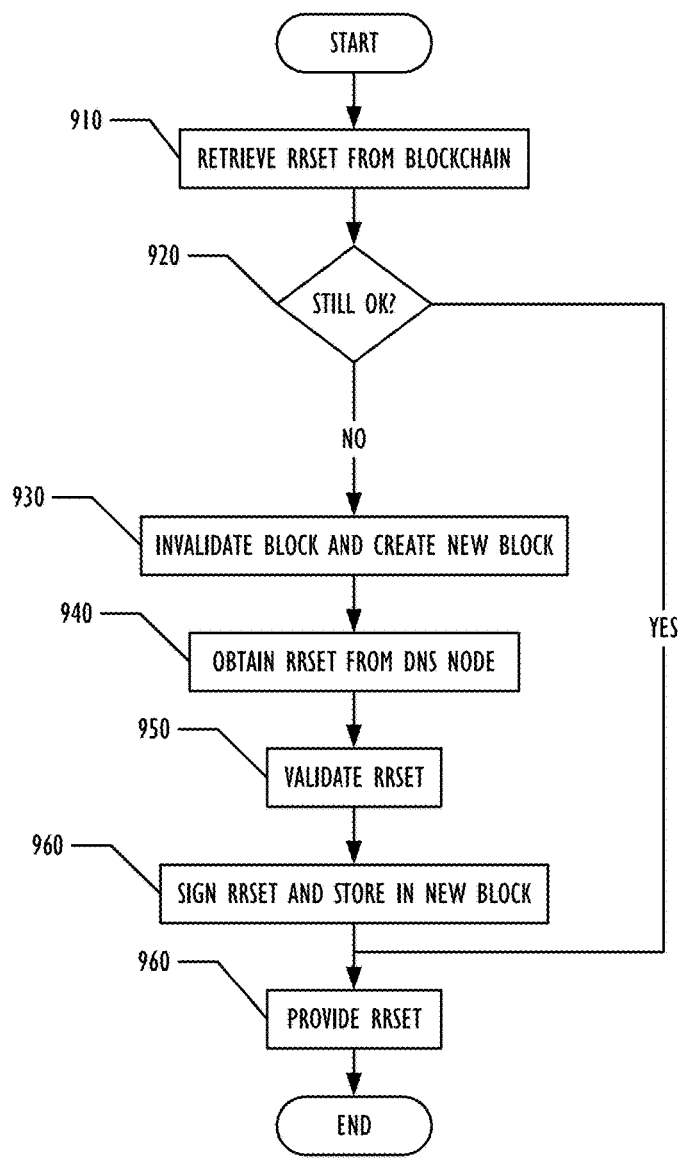

FIG. 9 is a flowchart illustrating retrieval of an RRset from a blockchain according to one embodiment. In block 910, the RRset is retrieved from the blockchain. The RRset is then validated to determine whether, for example, its Time-To-Live timestamp indicates the RRset has expired. Other validation actions may be taken as desired. If the RRset is no longer valid, such as having expired, then in block 930 the block containing the RRset is marked as invalid or corrupt and a new blockchain block is created. The marking is not made in the block itself, because that would require recalculating block headers of all blocks at a higher level. Rather, the invalid block marking is maintained external to the block chain, such as in a database of the block hash values described above.

In blocks 940-960 a new copy or version of the RRset is obtained and stored in the new blockchain block, similar to the procedure described in FIG. 8. Finally, the RRset is provided to the requestor in block 960.

Figure 10:
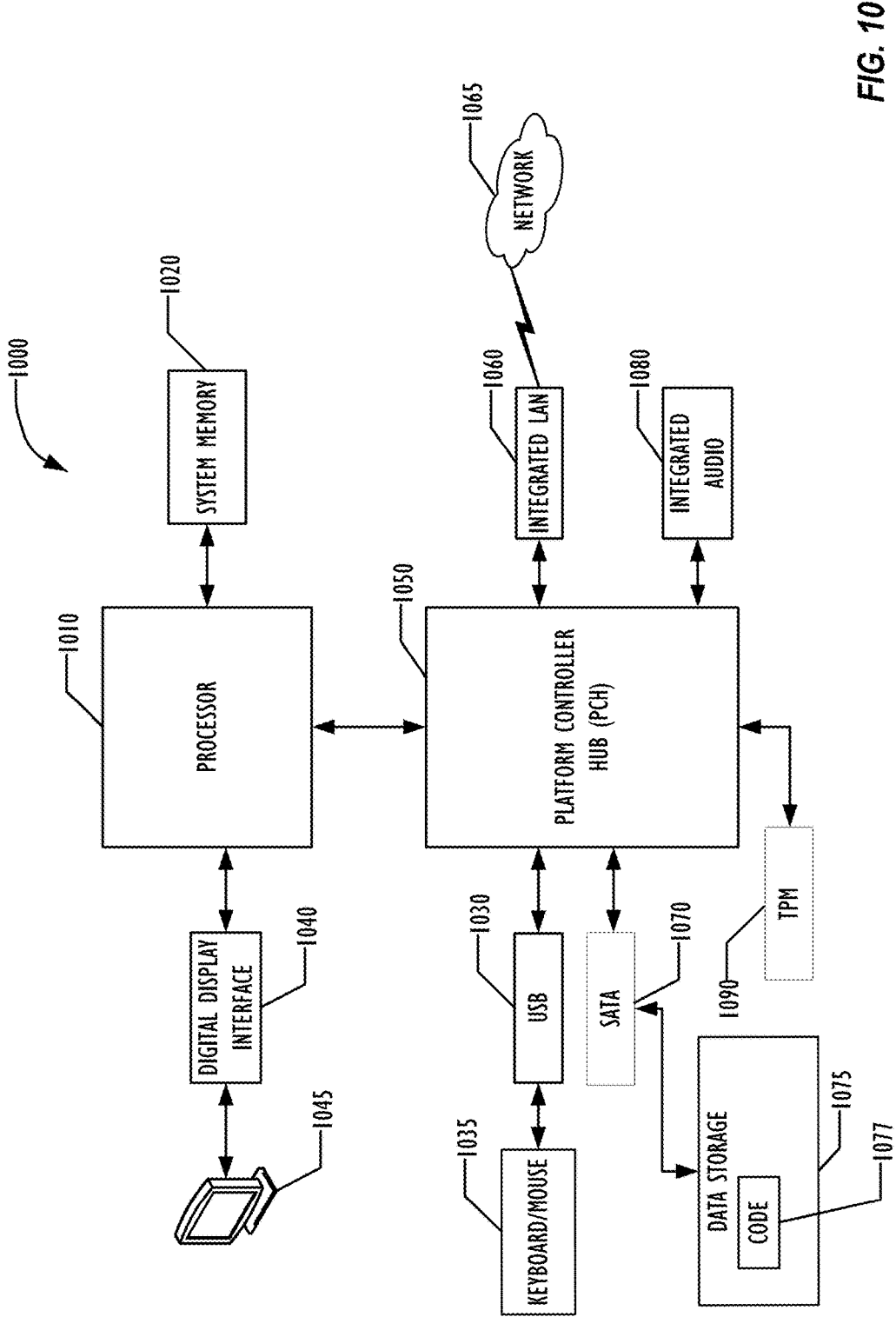
FIG. 10 is a block diagram illustrating a programmable device for implementing the techniques described herein according to one embodiment.

FIG. 10 is a block diagram illustrating a programmable device 1000 that may be used to perform the blockchain manipulation described above. One or more processors 1010, which may be multi-core processing units provide processing capability for performing the actions. A system memory 120 may be connected to the processor(s) 1010 using any desired form of interconnect. In some embodiments, a display interface 1040 and display 1045 may provide the capability for an administrator to manage the system 1000; in many embodiments, the system 1000 may be a rack-mounted server with no directly connected display capability. Platform controller hub 1050 may provide input/output (I/O) capability in any desired form. As illustrated in FIG. 10, a Universal Serial Bus (USB) interface 1030 may provide for connecting input devices such as keyboard and mouse 1035; other types of USB-connected devices may be used, including disc drives for storage. In some embodiments a Serial AT Attachment (SATA) interface 1070 provides the ability to connect data storage devices 1075 that can provide storage for data and instructions that when executed cause the processors(s) 1010 to perform the actions described herein. The data storage devices may be any type of machine readable media, including removable media, that are capable of storing instructions that when executed cause the programmable device 1010 to perform the desired functionality. A network interface 1060 provides connectivity to network 1065, which may be one or more interconnected network. An audio interface 1080 may also provide audio input and output capability, if desired. A Trusted Platform Module 1090 may be provided in some embodiments for providing a secure processing capability, such as secure capability for encryption and decryption.

By using blockchain technology, out-of-band validation and security of RRset data may be provided with significant performance and reliability benefits. As described above, third parties may offer blockchain management services for DNS servers, or the DNS servers, otherwise unchanged, may manage the blockchains for themselves, as an alternate form of a DNS cache.

While certain exemplary embodiments have been described in details and shown in the accompanying drawings, it is to be understood that such embodiments are merely illustrative of and not devised without departing from the basic scope thereof, which is determined by the claims that follow.

I claim:

1. A non-transitory machine readable medium, on which are stored instructions for providing out-of-band validation of domain name system records, comprising instructions that when executed cause a machine to:
    store domain name system resource records in a private blockchain associated with a domain name server,
        wherein the domain name system resource records comprise resource records containing public keys for verification of a cryptographic signature of one or more other domain name system resource records; and
    retrieve domain name system resource records from the private blockchain responsive to a request to the domain name server for the domain name system resource records, without traversing a chain of trust through a hierarchy of domain name servers to a root of the hierarchy, wherein the instructions comprise instructions that when executed cause a machine to:
    retrieve the domain name system resource records from a first block of the private blockchain;
    determine whether the retrieved domain name system resource records have expired; and
    responsive to a determination that the retrieved domain name system resource records have expired:
        invalidate the first block in the private blockchain;
        create a new block on the private blockchain;
        obtain updated domain name system resource records from a domain name server authorized to provide the updated domain name system resource records;
        validate the updated domain name system resource records using a domain name system security protocol;
        sign the validated updated domain name system resource records;
        store the signed validated updated domain name system resource records in the new block; and
        provide the updated name system resource records responsive to the request.

2. The machine readable medium of claim 1, wherein blocks in the private blockchain are signed by a third party authorized by the domain name server.

3. The machine readable medium of claim 2, wherein the instructions further comprise instructions that when executed cause the machine to:
    receive a request from the domain name server for the domain name system resource records;
    validate the request; and send to the domain name server the domain name system resource records retrieved from the private blockchain responsive to the validated request.

4. The machine readable medium of claim 3, wherein the instructions that when executed cause the machine to validate the request comprise instructions that when executed cause the machine to:
assign a token to the domain name server; and
determine that the request is validated if a token received with the request matches the token assigned to the domain name server.

5. The machine readable medium of claim 1, wherein the instructions that when executed cause the machine to store domain name system resource records comprise instructions that when executed cause the machine to:
identify a genesis node of the domain name system;
obtain and validate domain name system resource records associated with the genesis node;
create a genesis block on the private blockchain; and
store the domain name system resource records associated with the genesis node in the genesis block.

6. The machine readable medium of claim 1, wherein the instructions that when executed cause the machine to store domain name system resource records comprise instructions that when executed cause the machine to:
determine whether the domain name resource records are stored in the private blockchain;
obtain, responsive to a determination that the domain name resource records are not stored in the private blockchain, the domain name system resource records from a domain name server authorized to provide the domain name system resource records;
create a new block on the blockchain;
validate the domain name resource records; and
sign the validated domain name resource records and store the signed validated domain name records in the new block.

7. The machine readable medium of claim 1, wherein the private blockchain replaces a domain name system cache maintained by the domain name server.

8. A method of providing out-of-band security for a domain name system, comprising:
storing domain name system resource records in a private blockchain associated with a domain name server,
wherein the domain name system resource records comprise resource records containing public keys for verification of a cryptographic signature of one or more other domain name system resource records; and
retrieve domain name system resource records from the private blockchain responsive to a request to the domain name server for the domain name system resource records, without traversing a chain of trust through a hierarchy of domain name servers to a root of the hierarchy, comprising:
retrieving the domain name system resource records from a first block of the private blockchain;
determining whether the retrieved domain name system resource records have expired; and
invalidating the first block in the private blockchain, responsive to a determination that the retrieved domain name system resource records have expired;
creating a new block on the private blockchain;
obtaining updated domain name system resource records from a domain name server authorized to provide the updated domain name system resource records;
validating the updated domain name system resource records using a domain name system security protocol;
signing the validated updated domain name system resource records;
storing the signed validated updated domain name system resource records in the new block; and
providing the updated name system resource records responsive to the request.

9. The method of claim 8, wherein blocks in the private blockchain are signed by a third party authorized by the domain name server.

10. The method of claim 9, further comprising:
receiving a request from the domain name server for the domain name system resource records;
validating the request; and
sending to the domain name server the domain name system resource records retrieved from the private blockchain responsive to the validated request.

11. The method of claim 10, wherein validating the request comprises:
assigning a token to the domain name server; and
determining that the request is validated if a token received with the request matches the token assigned to the domain name server.

12. The method of claim 8, wherein storing domain name system resource records comprises:
identifying a genesis node of the domain name system based on information external to the domain name system;
obtaining and validating domain name system resource records associated with the genesis node;
creating a genesis block on the private blockchain; and
storing the domain name system resource records associated with the genesis node in the genesis block.

13. The method of claim 8, wherein storing domain name system resource records comprises:
determining whether the domain name resource records are stored in the private blockchain;
obtaining, responsive to a determination that the domain name resource records are not stored in the private blockchain, the domain name system resource records from a domain name server authorized to provide the domain name system resource records;
creating a new block on the private blockchain;
validating the domain name resource records; and
signing the validated domain name resource records and store the signed validated domain name records in the new block.

14. A system for securing domain name system resource records, comprising:
one or more processors;
a memory, on which are stored instructions, comprising instructions that when executed cause at least some of the one or more processors to:
maintain a plurality of private blockchains, each associated with a domain name server of a plurality of domain name servers, where each of the plurality of private blockchains caches domain name system resource records for the corresponding domain name server,
wherein the domain name system resource records comprise resource records containing public keys for verification of a cryptographic signature of one or more other domain name system resource records;

authenticate a request from a domain name server of the plurality of domain name servers; and retrieve domain name server resource records from a blockchain of the plurality of private blockchains associated with the domain name server, responsive to the request, without traversing a chain of trust through a hierarchy of domain name servers to a root of the hierarchy, wherein the instructions comprise instructions that when executed cause the one or more processors to:

retrieve the domain name system resource records from a first block of the private blockchain;

determine whether the retrieved domain name system resource records have expired; and responsive to a determination that the retrieved domain name system resource records have expired:
 invalidate the first block in the private blockchain;
 create a new block on the private blockchain;
 obtain updated domain name system resource records from a domain name server authorized to provide the updated domain name system resource records;
 validate the updated domain name system resource records using a domain name system security protocol;
 sign the validated updated domain name system resource records;
 store the signed validated updated domain name system resource records in the new block; and
 provide the updated name system resource records responsive to the request.

15. The system of claim 14, wherein the instructions further comprise instructions that when executed cause at least some of the one or more processors to:

associate a security information with each of the plurality of domain name servers; and authenticate the request responsive to a match of a security information contained in the request with the security information assigned to the domain name server making the request.

16. The system of claim 14, wherein the instructions that when executed cause at least some of the one or more processors to store domain name system resource records comprise instructions that when executed cause at least some of the one or more processors to:

identify a genesis node of the domain name system;

obtain and validate domain name system resource records associated with the genesis node;

create a genesis block on the private blockchain; and store the domain name system resource records associated with the genesis node in the genesis block.

17. The system of claim 14, wherein the instructions that when executed cause at least some of the one or more processors to store domain name system resource records comprise instructions that when executed cause at least some of the one or more processors to:

determine whether the domain name resource records are stored in the private blockchain;

obtain, responsive to a determination that the domain name resource records are not stored in the private blockchain, the domain name system resource records from a domain name server authorized to provide the domain name system resource records;

create a new block on the private blockchain;

validate the domain name resource records; and sign the validated domain name resource records and store the signed validated domain name records in the new block.

* * * * *